(12) United States Patent
Kemp et al.

(10) Patent No.: US 10,836,638 B2
(45) Date of Patent: Nov. 17, 2020

(54) METAL PHOSPHIDE NANOMATERIALS PREPARED FROM SINGLE SOURCE METAL AMIDES

(71) Applicants: STC.UNM, Albuquerque, NM (US); SANDIA CORPORATION, Albuquerque, NM (US)

(72) Inventors: Richard Alan Kemp, Albuquerque, NM (US); Diane Dickie, Albuquerque, NM (US); Bernadette A. Hernandez-Sanchez, Albuquerque, NM (US); Timothy N. Lambert, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 295 days.

(21) Appl. No.: 15/565,670

(22) PCT Filed: Apr. 8, 2016

(86) PCT No.: PCT/US2016/026743
§ 371 (c)(1),
(2) Date: Oct. 10, 2017

(87) PCT Pub. No.: WO2016/164791
PCT Pub. Date: Oct. 13, 2016

(65) Prior Publication Data
US 2018/0072572 A1 Mar. 15, 2018

Related U.S. Application Data

(60) Provisional application No. 62/145,927, filed on Apr. 10, 2015.

(51) Int. Cl.
*C01B 25/08* (2006.01)
*B82Y 40/00* (2011.01)
*C07F 9/50* (2006.01)
*B82Y 30/00* (2011.01)
*C22C 1/00* (2006.01)

(52) U.S. Cl.
CPC .............. *C01B 25/08* (2013.01); *B82Y 40/00* (2013.01); *C01B 25/082* (2013.01);
(Continued)

(58) Field of Classification Search
None
See application file for complete search history.

(56) References Cited

U.S. PATENT DOCUMENTS

| 2006/0063155 | A1* | 3/2006 | Kohler | C07F 9/4009 435/6.11 |
| 2006/0094860 | A1* | 5/2006 | Take | C22C 12/00 528/403 |
| 2008/0280143 | A1* | 11/2008 | Renaud | B82Y 30/00 428/411.1 |

FOREIGN PATENT DOCUMENTS

| CN | 102583282 A * | 7/2012 |
| EP | 1985583 A2 | 10/2008 |
| EP | 2194109 A1 | 6/2010 |

OTHER PUBLICATIONS

Schweyer-Tihay, F. et al., "Synthesis and Characterization of Supported Co2P Nanoparticles by Grafting of Molecular Clusters into Mesoporous Silica Matrixes", Chemistry of Materials, vol. 15, pp. 57-62, published on Web Nov. 8, 2002.*

(Continued)

*Primary Examiner* — George Wyszomierski
(74) *Attorney, Agent, or Firm* — Keith Vogt, Ltd.; Keith A. Vogt

(57) ABSTRACT

The present invention provides a novel solution or route for metal phosphide ($MP_x$) nanomaterials from the thermal decomposition of metal bis[bis(diisopropylphosphino)amide], $M[N(PPri_2)_2]_2$, and/or single-source precursors. Synthetic routes to $MP_x$ nanomaterials may be used in energy applications including batteries, semiconductors, magnets, catalyst, lasers, inks, electrocatalysts and photodiodes.

12 Claims, 2 Drawing Sheets

(52) U.S. Cl.
CPC ............ *C07F 9/5045* (2013.01); *B82Y 30/00* (2013.01); *C01P 2002/72* (2013.01); *C01P 2004/04* (2013.01); *C01P 2004/64* (2013.01); *C22C 1/00* (2013.01); *Y10S 977/773* (2013.01); *Y10S 977/81* (2013.01); *Y10S 977/825* (2013.01); *Y10S 977/896* (2013.01)

(56) References Cited

OTHER PUBLICATIONS

Buchwalter, P. et al., "Stoichiometric molecular single source precursors to cobalt phosphides", Inorganica Chimica Acta, vol. 409, pp. 330-341, Available online Sep. 24, 2013.*

Lee, T.K-M. et al., "Hexanuclear Gold(I) Phosphide Complexes as Platforms for Multiple Redox-Active Ferrocenyl Units", Chemistry: A European Journal, vol. 20, No. 1, pp. 304-310, first published Dec. 20, 2013.*

Wan, X.-K. et al., "Au19 Nanocluster Featuring a V-Shaped Alkynyl-Gold Motif", J. of the American Chemical Society, vol. 137, pp. 652-655, published Dec. 29, 2014.*

Federal Institute of Industrial Property; International Search Report & Written Opinion for PCT/US2016/026743; 7 pages; Jun. 16, 2016; Moscow, RU.

Xiang Huang et al; A novel solvothermal route to nanocrystalline Sn4P3 with red phosphorous as raw material; Advanced Material Research; 2013; vol. 704; pp. 241-245.

Russell Binions et al; Germanium phosphide coatings from the atmospheric pressure chemical vapor deposition of GeX4 (X=Cl or Br) and PCye hex H2.; Polyhedron 2003; No. 13; pp. 1683-1688; abstract.

* cited by examiner

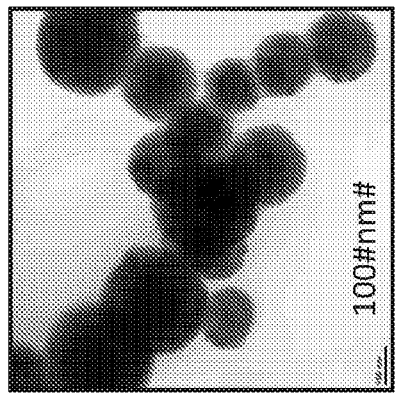
FIG. 5A SnP TEM Image
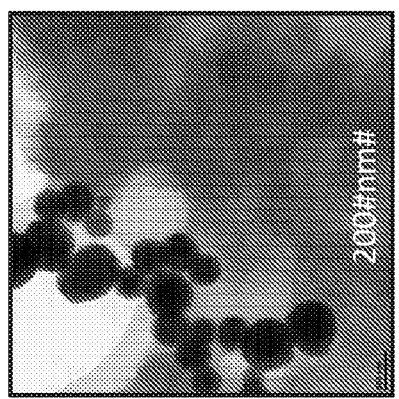
FIG. 5B SnP TEM Image
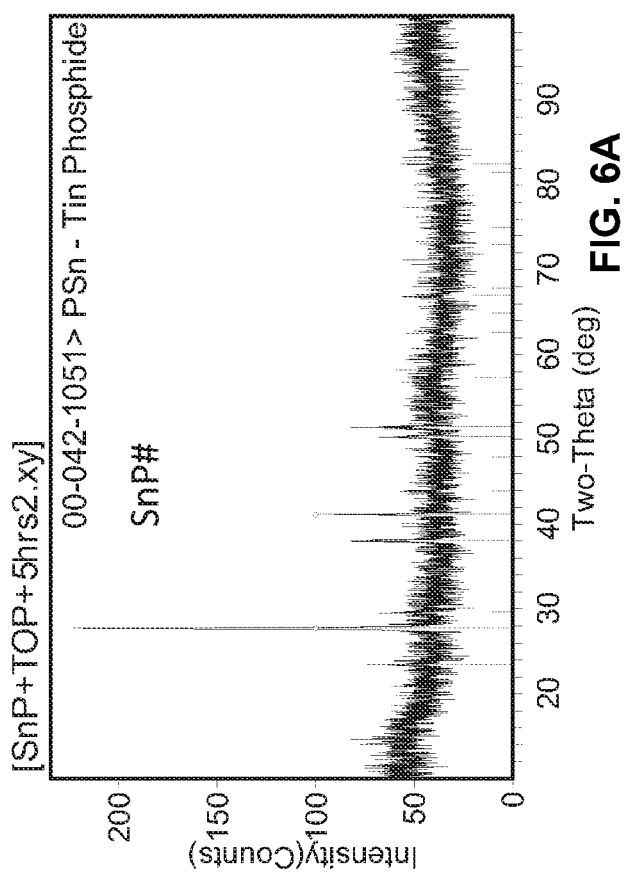
FIG. 6A
FIG. 6B

METAL PHOSPHIDE NANOMATERIALS PREPARED FROM SINGLE SOURCE METAL AMIDES

RELATED APPLICATIONS

This application claims the benefit of U.S. Provisional Application No. 62/145,927 filed Apr. 10, 2015 and herein incorporated by reference.

STATEMENT REGARDING FEDERALLY SPONSORED RESEARCH & DEVELOPMENT

This invention was made with government support under Contract Number DE-AC04-94AL85000 awarded by Department of Energy and Contract Number CHE1213529 awarded by and National Science Foundation. The government has certain rights in the invention.

INCORPORATION BY REFERENCE OF MATERIAL SUBMITTED ON A COMPACT DISC

Not applicable.

BACKGROUND OF THE INVENTION

Various metal phosphide (MP) nanomaterials have shown promise as high capacity anodes in ceramic/air batteries, as electrocatalysts and in other applications. However, there is a need to produce such namomaterials using processes that avoid high temperature solid-state reactions, high temperature solution processing, and detrimental halide contamination products.

BRIEF SUMMARY OF THE INVENTION

In one embodiment, the present invention provides a novel solution or route for metal phosphide ($MP_x$) nanomaterials from the thermal decomposition of metal bis[bis(diisopropylphosphino)amide], $M[N(PPr_2^t)_2]_2$, and/or single-source precursors. Synthetic routes to $MP_x$ nanomaterials are of interest for energy applications including: batteries, semiconductors, magnets, catalysts, lasers, and photodiodes.

In another embodiment, the present invention provides a novel route to $MP_x$ that avoids high temperature solid-state reactions, high temperature solution processing, and detrimental halide contamination products. Nano $MP_x$ were generated by solution precipitation/solvothermal processing routes using $M[N(PPr_2^t)_2]_2$ at considerably lower temperatures and times. $MP_x$ can be produced from almost all the metals found in the periodic table.

In another embodiment, the present invention provides a novel route to $MP_x$ that avoids high temperature solid-state reactions wherein the solution processing route and precursor lower the processing temperature as compared to a solid state reaction.

In another embodiment, the present invention provides a novel route to $MP_x$ that avoids high temperature solid-state reactions wherein the solution processing route and precursor lower the processing temperature by converting a metal amide to a metal or metal phosphide nanoparticle.

In another embodiment, the present invention provides a novel route to $MP_x$ that avoids high temperature solid-state reactions wherein the solution processing route and precursor lower the processing temperature by decomposing a metal amide to a metal or metal phosphide nanoparticle.

In another embodiment, the present invention provides a process that is halide free.

In another embodiment, the present invention provides a process where nanomaterials are obtained from a halide free process.

In another embodiment, the present invention provides one or more processes where more than one metal amide is used during synthesis. In this embodiment, the processes may be used in the production of metal alloys or core-shells nanomaterials comprised of alloys or metal phosphides.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 5A is a TEM image an embodiment of the present invention.

FIG. 5B is a TEM image of another embodiment of the present invention.

FIG. 6A shows an x-ray diffraction pattern of the embodiment of the present invention shown in FIG. 5A.

FIG. 6B shows an x-ray diffraction pattern of the embodiment of the present invention shown in FIG. 5B.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

The present invention provides a general solution synthetic route for the production of metal phosphides (nanoscale to bulk) materials. In a preferred embodiment, the present invention does not require high processing temperatures (>350° C.) or additional thermal treatments, and avoids halide contamination in the final product.

In one preferred embodiment, metal phosphide nanomaterials, which may be $M_xP_y$, may be prepared from the thermal decomposition of a single source precursor such as a metal bis[bis(diisopropylphosphino)amide], $M[N(PPr_2^i)_2]_2$, $M[N(PR_2)_2]_x$, or $[M[N(PR_2)_2]_x]_y$, in high boiling coordinating or non-coordinating solvents. In other embodiments of the present invention, the precursor may be from several sources.

In another preferred embodiment of the present invention, the precursor converts to particles having a size in the range of 5-100 nm. In one embodiment, the precursor is used to produce SnP or $Sn_4P_3$, which may be in the size range of 5-100 nm. The particles may be formed by a solution precipitation processing route using $Sn[N(PPr_2^i)_2]_2$ in trioctylphosphine. In addition, depending on the conditions used (e.g.; solvent, time, temperature) the particle size and phase may be controlled.

In other embodiments, M may be a metallic element selected from the group consisting of Groups 1-15 in the Period Table of the Elements, Lanthanide elements (numbers 58-71), Actinide elements (numbers 90-92) or any transition metal which is a member of Group 3. In yet other embodiments, M is a metallic element selected from the group consisting of Mg, Ca, Sr, Sn, Al, Ga, In, Ti, Ge, Pb, Sb, Bi, Th, Pa, U, Ce, Pr, Nd, Pm, Sm, Eu, Gd, Tb, Dy, Ho, Er, Tm, Yb, Lu and Ba.

In other embodiments, R may be $Pr^i$. R may also equal H, or be any linear or branched alkyl group and substituted analogs, any aryl or substituted aryl, any silyl alkyl or silyl aryl group, or any other group that serves essentially the same purpose, or mixtures thereof.

In yet other embodiments, x may vary from 1 to 5 depending on the valent state of the metal, where x is chosen to balance the charges of the precursor such as $M[N(PPr_2^i)_2]_2$, $M[N(PR_2)_2]_x$, or $[M[N(PR_2)_2]_x]_y$.

Figure 1:
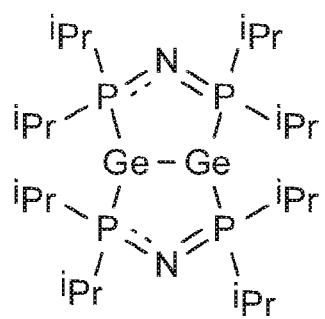
FIG. 1 illustrates a substituent that may be used with an embodiment of the present invention.

In other embodiments, the present invention provides nanoparticle precursors other than isopropyls. For example, in yet another preferred embodiment, the present invention provides a mixture of isopropyl and phenyl substituents that may be used as the nanoparticle precursors as shown in FIG. 1, including any salt, stereoisomer, or adduct thereof.

Figure 2:
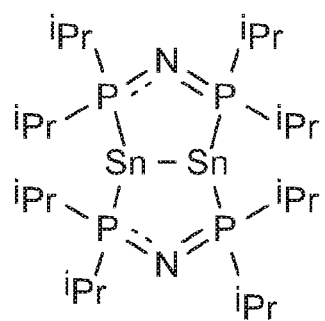
FIG. 2 illustrates different metal/ligands and ratios that may be used with embodiments of the present invention.
Figure 3:
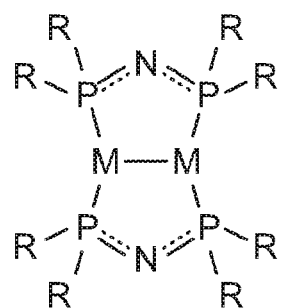
FIG. 3 illustrates a substituent that may be used with an embodiment of the present invention.
Figure 4:
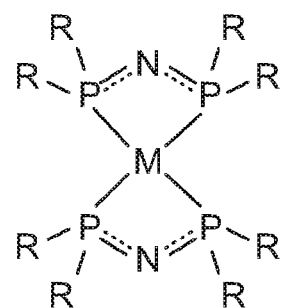
FIG. 4 illustrates another substituent that may be used with an embodiment of the present invention.

In yet other embodiments, besides providing a metal with two ligands (i.e. $M[N(P^iPr_2)_2]_2$), the present invention may also provide a 1:1 metal/ligand ratio as well as other stoichiometries as shown in FIG. 2 including any salt, stereoisomer, or adduct thereof. FIGS. 3 and 4 illustrate other substituents that may be used with the embodiments of the present invention, including any salt, stereoisomer, or adduct thereof, wherein each R can be the same or different and each M can be the same or different.

FIG. 5A and FIG. 5B show TEM images of nanomaterials made in accordance with the teachings of the present invention. FIG. 6A shows an x-ray diffraction pattern of the nanomaterial shown in FIG. 5A. FIG. 6B shows an x-ray diffraction pattern of the nanomaterial shown in FIG. 5B.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A method of making nanomaterials comprising the steps of: providing a precursor, said precursor is a solution comprising a metal bis[bis(diisopropylphosphino) amide $[M[N(PR_2)_2]_x]_y$; thermally decomposing said metal bis[bis(diisopropylphosphino) amide $[M[N(PR_2)_2]_x]_y$ precursor to form metal phosphide nanomaterials; wherein M is a metal; wherein R is a linear or branched alkyl group and substituted analogs, an aryl or substituted aryl, a silyl alkyl or silyl aryl, or mixtures thereof; wherein x is 0, 1, 2, 3, 4, or 5 depending on the valent state of said metal; and wherein x is chosen to balance the charges of said $[M[N(PR_2)_2]_x]_y$ molecule; and wherein y ranges from 1 to about 5.

2. The method of claim 1 wherein said nanomaterials are $MP_x$.

3. The method of claim 1 wherein said nanomaterials are $M_xP_y$.

4. The method of claim 1 wherein M is a metallic element selected from the group consisting of Groups 1-15 in the Period Table of the Elements.

5. The method of claim 1 wherein M is a Lanthanide.

6. The method of claim 1 wherein M is an Actinide.

7. The method of claim 1 wherein said precursor converts to SnP.

8. The method of claim 1 wherein said precursor converts to $Sn_4P_3$.

9. The method of claim 1 further comprising controlling the size of said nanomaterials by changing the temperature of said thermal decomposition.

10. The method of claim 1 wherein M is a metallic element selected from the group consisting of Al, Ga, In, and Tl.

11. The method of claim 1 wherein M is a metallic element selected from the group consisting of Ge, Sn, and Pb.

12. The method of claim 1 wherein M is a metallic element selected from the group consisting of Sb and Bi.

* * * * *